United States Patent Office 3,544,382
Patented Dec. 1, 1970

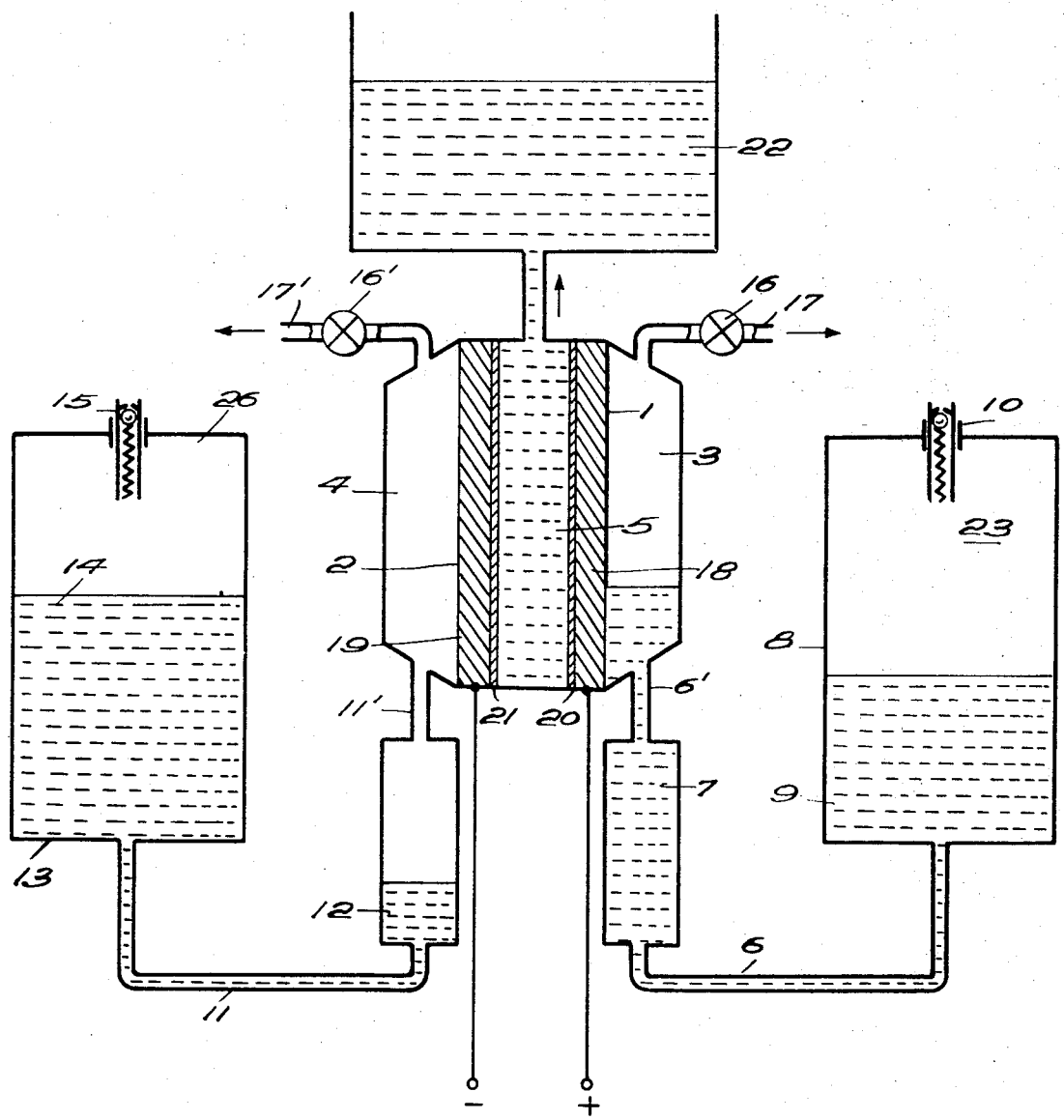

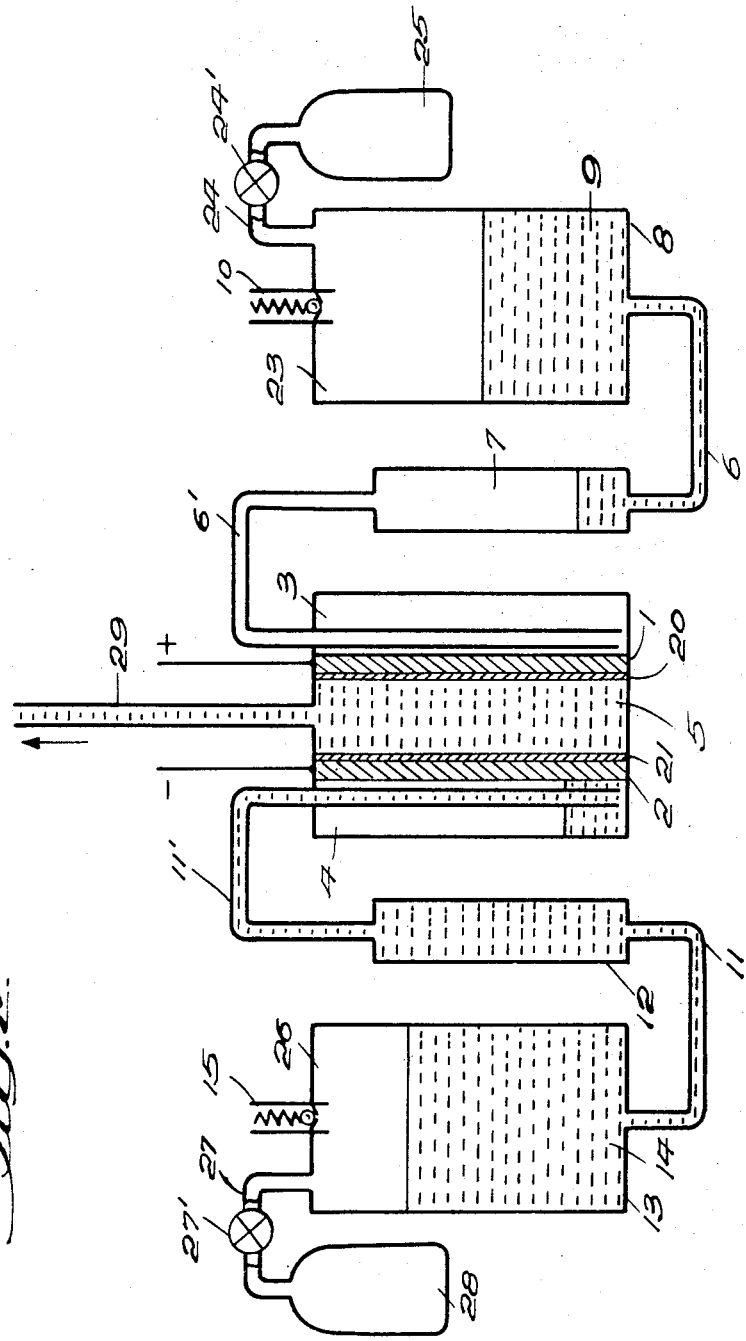

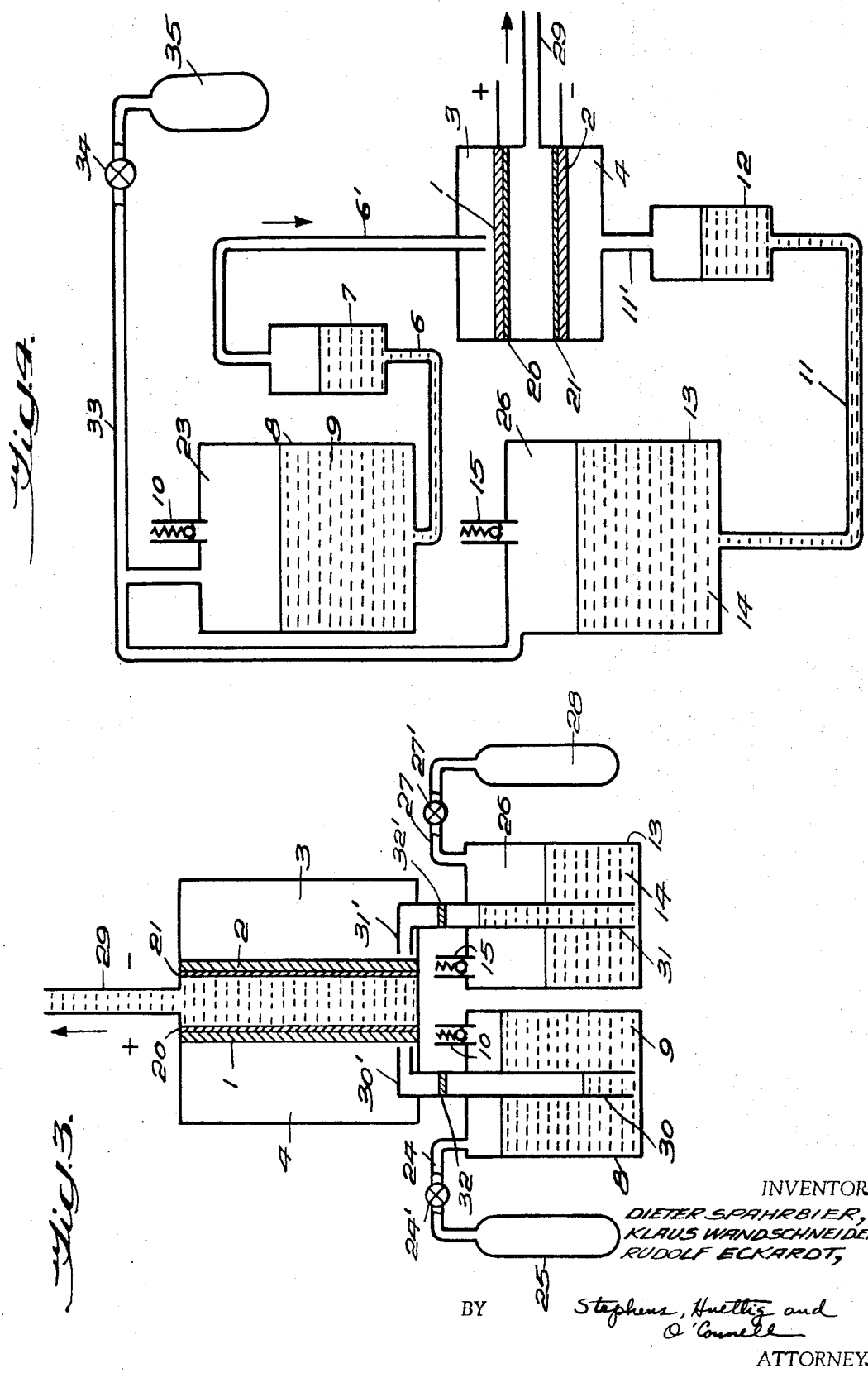

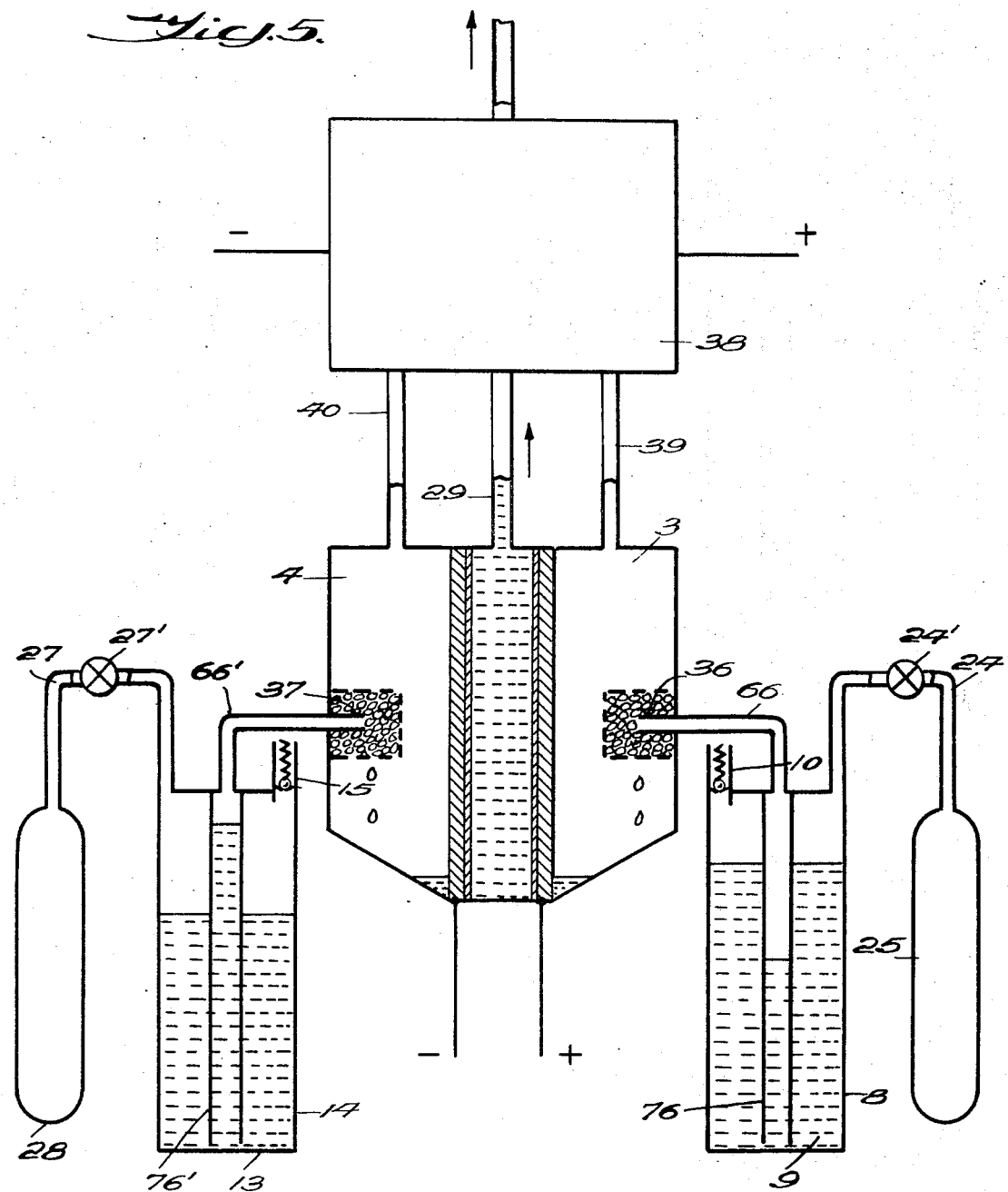

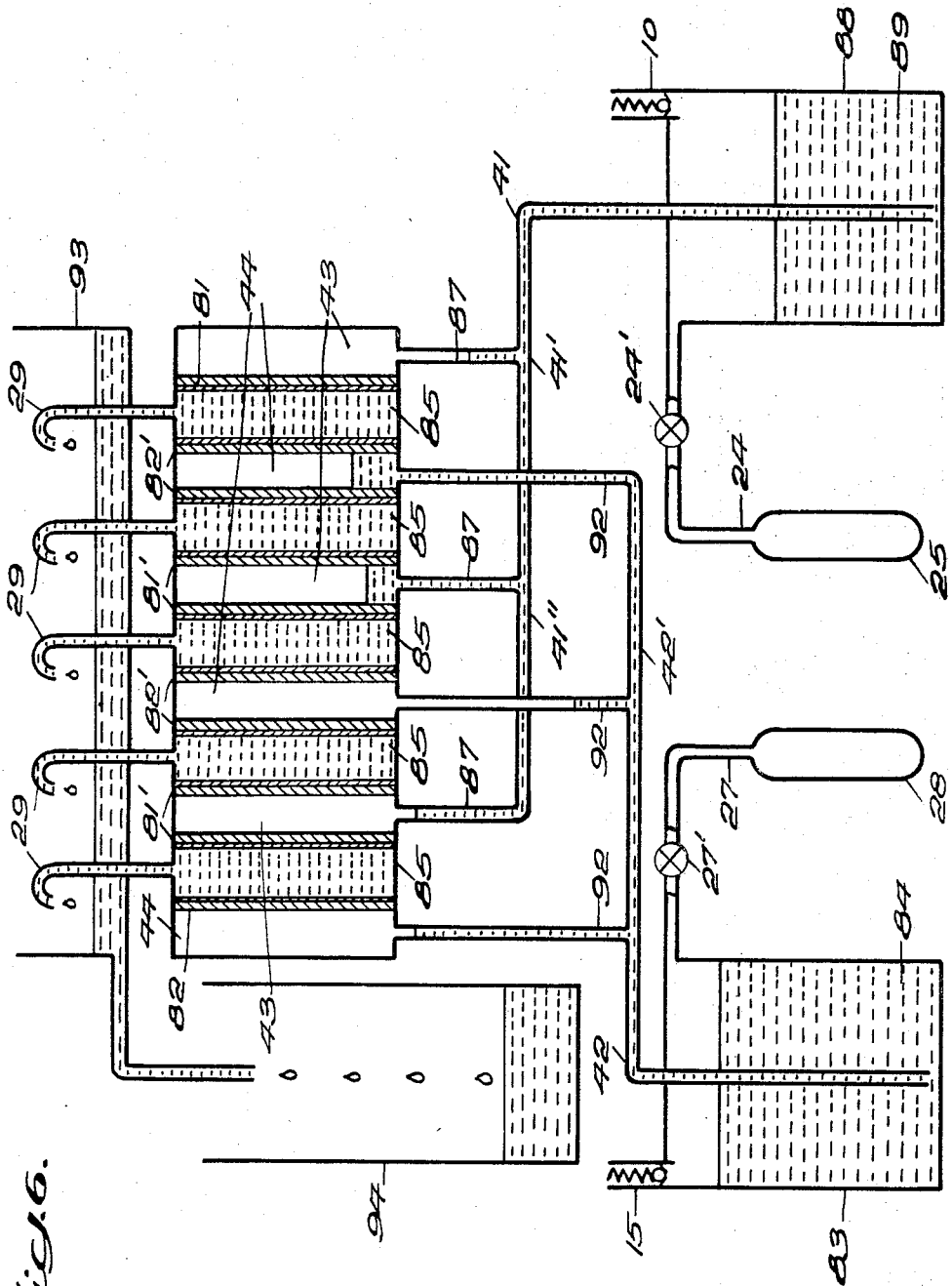

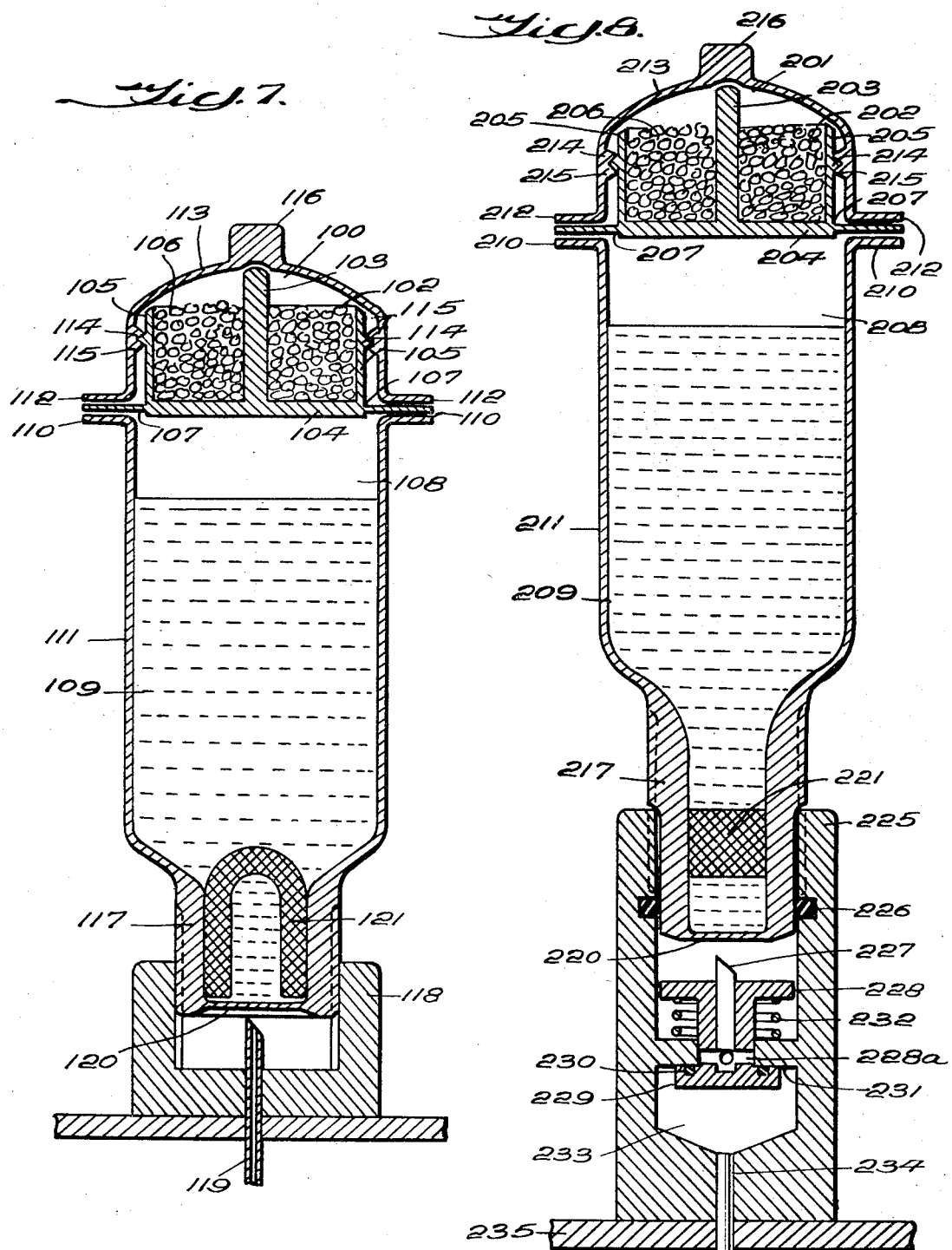

3,544,382
FUEL CELL DEVICE FOR CONTINUOUS OPERATION
Dieter Spahrbier, Frankfurt am Main, Klaus Wand-schneider, Kelkheim, and Rudolf Eckardt, Steinbach, Germany, assignors to Varta Aktiengesellschaft, Frankfurt am Main, Germany
Filed July 1, 1968, Ser. No. 741,405
Claims priority, application Germany, July 8, 1967,
V 34,027; July 21, 1967, V 34,121, V 34,122
Int. Cl. H01m 27/12
U.S. Cl. 136—86                                                              20 Claims

ABSTRACT OF THE DISCLOSURE

In the liquid supply conduit system used for supplying gas precursors in liquid form to the catalytically active surfaces of gas diffusion electrodes there is provided a pressure pipe or rising main which is used to regulate the flow of such liquids to such electrodes during continuous operation thereof under various electrical load conditions.

BACKGROUND OF THE INVENTION

Field of the invention

The invention relates to the field of fuel cell elements in which porous gas diffusion electrodes are employed with liquid reactants and electrolyte.

Description of the prior art

German Pats. 1,180,433 and 1,180,438 disclose that hydrogen diffusion electrodes can be operated in fuel elements in which an electrolyte solution which contains sodium borohydride is supplied to the electrode. The sodium borohydride is then decomposed to form hydrogen upon contact with catalyst material in the electrode.

British Pat. 963,254 discloses a fuel element wherein a solution of hydrogen peroxide is forced through the porous oxygen electrode and the excess electrolyte together with water which is formed by the decomposition of the hydrogen peroxide is removed from the electrolyte chamber between the two electrodes.

The fuel cell elements or fuel cell batteries which have been known to those in the art to date require auxiliary devices for the removal of water, for rinsing electrodes, for lowering concentration polarization and for removing inert gases which are generated. These auxiliary devices lessen the security of the operation of the fuel elements. In many instances these mechanically complicated systems must be supervised at least during their start up times in order to avoid operating troubles. The cost of producing, and the spatial requirements of fuel cell elements and batteries, moreover, are increased by these auxiliary devices.

One type of auxiliary device which has been used in fuel cell elements wherein a fluid, which can be decomposed with the attendant formation of hydrogen or oxygen, is fed to the catalyst of an electrode is a metering means which is required for metering the supply of such fluid in quantities which correspond to the consumption thereof.

SUMMARY OF THE INVENTION

An object of the present invention is to provide compact simple fuel cell elements which do not have the disadvantages of the prior art fuel cell elements and which do not need the service requirements for auxiliary aggregates.

Another object of the present invention is to provide fuel cell elements in which metering of quantities of fluids which have to be supplied to fuel cell elements can be regulated by the consumption of the operating chemicals in a simple way without the use of complicated auxiliary aggregates.

BRIEF DESCRIPTION OF THE DRAWINGS

FIG. 1 shows an embodiment of an individual fuel cell element of the present invention.

FIGS. 2 to 5 show various modifications of the individual fuel cell element of FIG. 1.

FIG. 6 shows a device employing a plurality of fuel cell elements in accordance with the present invention.

FIGS. 7 and 8 show filling cartridges which may be employed with the fuel cell elements of FIGS. 1–6.

DESCRIPTION OF THE PREFERRED EMBODIMENTS

The present invention relates to fuel cell elements or batteries which employ porous gas diffusion electrodes and aqueous electrolyte and operate continuously with the aid of liquid or dissolved substances which are decomposed on catalyst in the electrode with the attendant formation of hydrogen gas and/or oxygen gas. The novel fuel cell element of the present invention is characterized in that it contains a storage vessel for the liquid hydrogen or oxygen carrier which is in liquid carrier supply communication with the surface of the catalytically active layer of the electrode by means of a supply conduit or a supply conduit system wherein there is inserted a rising main or gas receiver having a suitable volume, as will be discussed below. The term rising main or pressure pipe as used in this description and in the claims is intended to denote the part of the supply system having the following essential design features. The rising main or gas receiver is a vessel having at least two openings. One opening or a group of openings is connected to the storage vessel and the second opening or group of openings is connected to the surface of the catalytically active layer of the electrode. The first opening or group of openings is situated vertically below the second opening or group of openings.

An open chamber or space in front of the catalytic layer of the electrode must also be regarded as part of this supply conduit and this space or chamber can be partially or, under certain operating conditions, even completely filled with electrolyte. This chamber can also contain, in some embodiments of the fuel cell elements of the present invention, a capillary system in the form of a porous, electricity conducting or non-conducting, catalytically inactive layer which is adjacent to the catalytically active layer of the electrode. The liquid gas carrier substance is preferably used in admixture with another solvent in order to standardize concentrations. The dissolved operating gas precursors or gas carriers can be dissolved in various known solvents. In a preferred embodiment of the fuel cell elements of the present invention the liquid gas carrier supply vessel contains a carrier for hydrogen or oxygen which is soluble in the same liquid electrolyte as is contained in the electrolyte chamber of the fuel cell element. In this embodiment of the fuel cell elements of the present invention the pores of the electrodes are continuously rinsed with fresh electrolyte solution by reflowing carrier liquid.

One embodiment of the fuel cell elements of the present invention which is advantageous is one in which the electrolyte chamber contains at least one outlet opening for excess electrolyte which comes into being due to the influx of the carrier liquid.

The electrolyte chamber of the fuel cell element must contain a liquid electrolyte for the removal of excess carrier fluid. Particularly advantageous in this regard is a form of the fuel cell elements of the present invention, in which the electrolyte chamber of the fuel cell element contains a liquid electrolyte which is placed in a porous diaphragm. If the diaphragm is more fine pored than the catalytically active layer of the adjacent electrode, then the liquid electrolyte is held in the diaphragm and the capillary pressure in the diaphragm which is in intimate contact with the electrode effectively prevents, respectively in combination with a fine pored cover layer of the electrode, the passage of gas into the electrolyte chamber.

In another advantageous embodiment of the present invention the fuel cell element is also used for supplying gas to the other fuel cell electrodes of the battery. The gas passage openings of the gas chamber of the electrodes are then placed in gas supply communication with the gas chambers of one or more hydrogen-oxygen fuel cell elements.

The inflow of fresh electrolyte solution, which is combined with the supplying of the liquid carrier in the fuel cell elements of the present invention, can also be effectively used for rinsing the electrolyte chambers of other fuel cell elements. In this embodiment of the fuel cell elements of the present invention the electrolyte outlet openings in the electrolyte chambers of the fuel cell elements are placed in liquid supply communication with one or more electrolyte inlet openings of other fuel cell elements. The emitted liquid electrolyte then flows in a parallel flow or in a serial flow arrangement through the electrolyte chambers of the connected fuel cell elements. If the electrolyte concentration of the liquid carrier material is selected to be at a sufficiently high level, then in this way the dilution of the electrolyte by water formed during the electrochemical reaction can be effectively eliminated in all the connected fuel cell elements.

The flow of the liquid from the storage vessel through the rising main or gas receiver to the electrode is effected by a supply pressure, which prevails in the gas space above the level of the liquid in said storage vessel to assure a liquid head to the chamber adjacent to the electrode. When this supply pressure and the hydrostatic pressure of the liquid is larger than the gas pressure in the space behind the electrode liquid flows from the storage vessel to said space until equilibrium of pressure is achieved by gas generated by decomposition. The supply pressure in the storage vessel can be generated and maintained applying the well known techniques, e.g. connecting containers in which gas is stored under high pressure and reducing valves to said space.

The rising main or gas receiver having the suitable or appropriate volume which was mentioned above and which is placed in the supply conduit between the supply vessel and the catalytically active layers of the electrodes, effects the regulation of the supply of the liquid carrier to the electrode under different operating conditions and it makes it possible to use the fuel cell elements of the present invention under a wide variety of load conditions and still assure the preselected working pressure of the hydrogen or oxygen gases at the electrodes. The manner of operating the regulatory system is determined by the type of load under which the fuel cell element is operating.

At the lower loads control oscillations appear in the regulating system which are characterized by a movement of the column of liquid in the supply conduit. The causes for these control oscillations lie in the facts that:

(1) The decomposition of the liquid coreactants on the catalytically active layer of the electrodes does not take place spontaneously, and that
(2) The volume of liquid which is supplied in a given supply cycle of said oscillation to the active layer of the electrode produces more gas during its decomposition than is simultaneously used during the electrochemical reaction at the electrode.

The operating pressure of the reaction gas at the electrode must be in equilibrium with the supply pressure which prevails in the gas chamber above the reaction liquid in the supply vessel and the increased volume of operating gas has the effect therefore of forcing back the liquid into the rising main and the influx of additional reaction liquid to the catalytically active layer of the electrodes is thereby prevented. The volume of the rising main is then sufficient, if the total amount of the excess volume of gas can be taken up by the rising main and the supply circuit between the rising main and electrode under the preselected operating pressure of the reaction gases. If the decomposition of the remainder of the liquid which is present in the pores of the electrodes has terminated, the volume of the operating gases does not rise any further and the volume of gas is continuously lowered again due to the electrochemical reaction at the electrodes. The rising main, which may only be partially filled with gas, is again filled with the liquid which flows again from the supply vessel and after a corresponding lowering of the volume of gas the liquid can again flow to the catalytically active layer of the electrode and the cycle of the control oscillations begins anew.

When the fuel cell elements are subjected to high load conditions there arises:
(1) No control oscillations and
(2) The liquid reactant continuously flows to the electrode.

The amount of gas produced in a given unit of time is proportional to the surface area of the active layer of the electrode which is in contact with the liquid reactant. The consumption of gas during the electrochemical reaction at the electrode is proportional to the electric current which is widthdrawn. The amount of the liquid which is supplied is regulated, therefore, so that the surface area of the active layer of the electrodes which is in contact with the liquid is proportional to the flowing electric current. Under these load conditions a rising main of suitable volume is also necessary. The controlling action of the rising main is effective as soon as a high electrical load of the fuel cell element is switched off entirely or is greatly reduced. The remainder of the liquid, which is still in contact with the catalytically active layer of the electrodes, leads to a further formation of reaction gas, which is not electrochemically reacted because of the switched off electric current, and the volume of gas is increased behind the electrode. The liquid coreactant which is also located behind the electrode is forced from the electrode chamber through the supply conduit. The evolution of gas persists, however, until the remainder of the liquid, which is still present in the electrode, is reacted. The volume of the rising main is adequate for regulating the supplying of liquid at higher loadings of the fuel cell element, if it is at least as large as the volume of gas which arises by reason of the complete decomposition of the residual quantities of liquid that may be present in the electrodes under given operating conditions.

Expediently, the necessary volume of the rising main for the fuel cell element of the present invention is selected experimentally for small electrical loads as well as for large electrical loads for the fuel cell element. The necessary volume for the rising main depends not ony on different factors relating to the constructions of the fuel cell element or battery, but also on other factors involved in operating the fuel cell element or battery, such as, the type and concentration of the coreactants, the solvent which is employed, the temperature of the environment and the operating pressure of the operating gases which are produced, as well as the catalytic activity of the working layer of the electrodes with respect to the reaction of the liquid reactants and the development of the operating gases. The following factors require an increase in the necessary volume of the rising main:

(1) Increasing the distance of the orifice of the supply line from the active layer of the electrode and from the lowest point at which the liquid in the electrode chamber can still have access to the catalytically active layer of the electrode, (2) Increasing the concentration of the coreactants in the liquid, (3) Lowering the catalytic activity of the working layer of the electrode or, in a given case, the decomposition catalyst with respect to the decomposition of the reactant and the formation of the operating gas, (4) Increasing the temperature of the environment, (5) Lowering the operating pressure.

The following example is merely illustrative of the use of the fuel cell elements and batteries of the present invention and is not intended as a limitation upon such use.

EXAMPLE

The following example of a fuel cell element of the present invention provides one impression of the necessary size of the volume of the rising main.

A hydrogen diffusion electrode was employed which contained Raney nickel as a catalyst in addition to carbonyl nickel as a supporting skeleton and which had, for gas reaction purposes, an effective geometric electrode surface of 40 cm.$^2$. The operating temperature of the fuel cell element was 23° C., the operating pressure of the gases employed, hydrogen and oxygen, was 1 atmosphere excess pressure.

As liquid electrolyte there was employed a 6 N aqueous solution of sodium hydroxide. The hydrogen electrode was supplied with a 16% by weight aqueous solution of sodium borohydride in 6 N aqueous sodium hydroxide. The oxygen electrode, which contained Raney-silver as a catalyst, was supplied with a 30% by weight solution of hydrogen peroxide in water.

The necessary volume of the rising main for a fuel cell element operating at small loads, that is, at current densities up to 25 ma./cm.$^2$, was determined experimentally to be 10 cm.$^3$. With this volume for the rising main and at the noted small loadings there arose control oscillations having a duration period of about three minutes on the hydrogen side. The necessary volume of the rising main was determined for higher loadings of the fuel cell elements in a fuel cell battery consisting of 10 fuel cell elements. Each element contained one hydrogen and one oxygen electrode. For the formation of the hydrogen gas and oxygen gas needed in the entire battery the above mentioned liquid coreactants were supplied to the respective electrodes of one of the fuel cell elements, and the gases resulting from the reaction of these materials in such electrodes were then used to supply the gas needs of the remaining nine fuel cell elements of the battery.

The individual fuel cell elements were connected together electrically in series and were subjected to a load corresponding to a current density of 50 ma./cm.$^2$ or a total current of 2 a. Under these operating conditions the fuel cell element which is supplied with the liquid coreactants adjusts itself with respect to the regulation of the supply of these materials as though it were a fuel cell element operating under a load of 500 ma./cm.$^2$. Under these circumstances a proportional regulation was achieved, that is, with an increasing current the surface of the electrode which is in contact with the liquid reactant increases proportionally.

With the specified current density, about 30% of the electrode surface of the hydrogen electrodes as well as of the oxygen electrodes were covered by the corresponding solutions, and a volume of 15 cm.$^3$ was determined to be the necessary volume for the rising main.

With the named solutions the volume of the rising main on the oxygen side can be 10 times as small as that on the hydrogen side. The decomposition of the hydrogen peroxide solution after contact with the silver catalyst which is covered by the alkaline electrolytes occurs substantially freer of delays than the decomposition of the solution of sodium borohydride which is used in this instance on Raney-nickel.

In the fuel cell element of the present invention the supply of liquid coreactants is automatically readjusted continuously equivalent to the flow of electrical current and with the assurance of a preselected operating pressure. In this way the mean operating pressure remains constant. Notably, with the control oscillations which occur under the lower electrical loadings of the fuel cell elements small oscillations in pressure still occur. These oscillations in pressure can be held small by the use of suitable dimensions in the fuel cell elements. For this reason it is expedient that the volume of gas which is present in the storage container above the liquid therein be large in comparison to the excess volume of gas that arises in the control oscillations.

The present invention may be further explained by referring to the drawings. FIG. 1 shows one embodiment of a fuel cell element of the present invention. The fuel cell element itself consists of catalytically active oxygen electrode 1 and hydrogen electrode 2 and the respectively adjacent oxygen gas chamber 3 and hydrogen gas chamber 4. The electrolyte chamber is formed by a fine pored asbestos diaphragm 5 located between electrodes 1 and 2, in which the electrolyte, in this case a 6 N aqueous solution of sodium hydroxide, is stored. Adjacent to the oxygen gas chamber 3 there is placed a storage container 8 in liquid supply communication through conduit 6, rising main 7 and conduit 6$^1$ and storage container 8 contains, in this case, 30% by weight aqueous solution of hydrogen peroxide 9. Valve 10 is used for filling container 8 with solution 9. The lower part of hydrogen gas chamber 4 is also placed in liquid supply communication with storage container 13 through conduit 11, rising main 12 and conduit 11$^1$ and, in this case, storage container 13 contains a solution of sodium borohydride in aqueous sodium hydroxide 14. Valve 15 is used for filling container 13 with solution 14. Gas chambers 3 and 4 are provided with valves 16 and 16$^1$ which serve for the withdrawal of oxygen and hydrogen gas, respectively, and for supplying other fuel cell elements with such operating gases. For the operation of the fuel cell elements or fuel cell batteries, whose other electrodes are supplied with such gases over lines 17 and 17$^1$, solutions 9 and 14 flow from filled containers 8 and 13 through lines 6 and 11 to electrodes 1 and 2. The liquid solution in each case thus first only reaches the lower portion of the respective gas chambers and is then sucked in by the electrodes. Electrodes 1 and 2 each have a coarse pored catalytically inactive cover layer 20 and 21, respectively. The hydrogen peroxide is decomposed on catalytically active layer 18 of oxygen electrode 1 with the evolution of oxygen gas and the formation of water, and the solution of sodium borohydride in aqueous sodium hydroxide is decomposed on catalytically active working layer 19 of hydrogen electrode 2. Since the remainder of the electrodes of the battery exert a suction effect due to the electro-chemical reaction of the respective gases in such electrodes, solutions 9 and 14 are sucked up even higher into gas chambers 3 and 4, respectively.

There then occurs a turbulent decomposition of the solutions and the solution is forced by the resulting gas pressure from the gas chamber back into the rising main. The rising main is dimensioned in such a way that it accepts the excess volume of gas which occurs when the total catalytically active layer is in contact with the liquid reactant and the electrical current is switched off. In this way the excess gas is prevented from passing through the fluid and into the spaces 23 and 26 above the solutions in the storage containers and thus creating an increased gas pressure there, which would force excess amounts of the solutions from the storage containers into the gas chambers. With increasing consumption of the operating gases the solutions rise up again in the rising mains and procede again to the electrodes. There thus arises a regulation of the supply of the solutions which corresponds to the consumption thereof. Cover layers 20 and 21 prevent, with the increase in the gas pressure in chambers 8 and 13, the pores of the electrodes from being blown free of liquids and thereby allowing the gases to pass into electrolyte chamber 5. The rest of the solution which remains after the evolution of the oxygen gas and hydrogen gas is forced by the pressure of the gas in containers 8 and 13 through the pores of the electrodes and out into electrolyte chamber 5. As a result of the pressure which thereby arises in chamber 5 the excess electrolyte liquid is forced into collection container 22.

FIG. 2 shows another embodiment of a fuel cell element of the present invention. The fuel cell element of FIG. 2 differs from the fuel cell element of FIG. 1 in the following respects.

Conduits 6 and 11 still eventually open into the lower part of the wall of gas chambers 3 and 4, but they enter, through conduits 6' and 11' into the upper portion of the walls of gas chambers 3 and 4 and pass through the entire height of the gas chambers, from the top to the bottom thereof, before providing an orifice in said chambers.

The supply of liquids 9 and 14 to electrodes 1 and 2, respectively, also occurs, in the case of the fuel cell element of FIG. 2, by means of gas pressure. For this purpose a gas supply line 24 with a reducing valve 24' and an oxygen gas container 25 is connected to gas space 23 over the level of the liquid 9 in storage container 8. Similarly a gas supply line 27 with a reducing valve 27' and a storage container 28 for hydrogen gas is connected to gas space 26 over the level of the liquid 14 in storage container 13. The excess electrolyte fluid is conducted from electrolyte chamber 5, which is located between the cover layers 20 and 21 of electrodes 1 and 2, through conduit 29. The electrolyte fluid can, in a given case, be supplied through other additional fuel cell elements and is suitable then for rinsing these elements with fresh electrolyte since due to the flow of the two liquids new electrolyte is continuously introduced into electrolyte chamber 5.

FIG. 3 shows an additional embodiment of a fuel cell element of the present invention. In this embodiment of the fuel cell element conduits 6 and 6" and rising main 7 as well as conduits 11 and 11' and rinsing main 12 of FIGS. 1 and 2 have been combined to form composite rising mains 30 and 31, respectively, which lead from storage containers 8 and 13, which are arranged under the fuel cell element, to the base of electrodes 1 and 2.

The ends 30' and 31' of the rising mains are in the form of supply tubes which project up to the vicinity of the catalytically active layers of electrodes 1 and 2.

With longer operating periods of, for example, sintered catalytically active electrodes, the situation can arise, wherein small particles of catalyst may be released from the electrodes and at some point in time during the operation of the fuel cell elements such particles may be forced back into storage containers 8 and 13 due to back pressure of the fluids. The particles of catalyst would then cause a continuous evolution of gas in containers 8 and 13 which would lead to an increased discharge pressure on the surface of the liquids in supply vessels 8 and 13. For this reason suitable filter bodies 32 and 32', which are known commercially available materials, are inserted in rising mains 30 and 31, respectively, so as to retain the released particles of catalyst thereon.

FIG. 4 shows another embodiment of a fuel cell element of the present invention. In this embodiment electrodes 1 and 2 are arranged horizontally in the operating position of the fuel cell element. The two supply containers 8 and 13 are provided with a suitable pressure of gas which is supplied from gas container 35, which is filled with an inert pressurizing gas, such as nitrogen, and through reducing valve 34 and common gas line 33, and which gas pressure is used to discharge the liquids from containers 8 and 13. Liquid supply conduit 11' is connected to the lower positioned wall of gas chamber 4 and with liquid container 13 through rising main 12 and conduit 11. Liquid supply conduit 6' runs from, in one direction, over gas chamber 3 directly into such chamber and to the vicinity of the catalytically active layer of electrode 1 and, in the other direction, through rising main 7 and line 6 into liquid container 8. The liquid supply conduits are, in this embodiment of the fuel cell element of the present invention, to be dimensioned with due regard to the fact that at least for a part of the time almost the entire surface of the catalytically active layers of electrodes 1 and 2 are in contact with the liquid which is to be decomposed and, therefore, a substantially stronger evolution of gas can take place in this embodiment of the present invention than may occur in other embodiments of fuel cell elements of the present invention.

FIG. 5 shows an embodiment of a fuel cell element of the present invention in which liquid supply conduits 66 and 66' lead into additional catalyst beds 36 and 37, respectively, which beds are arranged in gas chambers 3 and 4, respectively. The lower ends of conduits 66 and 66' empty into rising mains 76 and 76'. The pressure required for delivering liquids 9 and 14 from containers 8 and 13 is supplied by inert pressurizing gas in gas cylinders 25 and 28 and excess electrolyte fluid is conducted over conduit 29 into a set of two fuel cell elements 38. Gas supply conduits 39 and 40 connect gas chambers 3 and 4 respectively, with corresponding gas chambers in fuel cell elements 38 so that the operating gases produced in chambers 3 and 4 can also be used to supply gas diffusion electrodes in fuel cell elements 38.

FIG. 6 shows an embodiment of a fuel cell battery of the present invention which comprises a plurality of fuel cell elements and wherein each of the hydrogen and oxygen electrodes of the individual elements are supplied with gas carrier liquids from common liquid supply containers 88 and 83 over liquid supply conduits 41 and 42, respectively. Container 88 holds the hydrogen gas carrier liquid 89 and container 83 holds the oxygen gas carrier liquid 84. Valves 10 and 15 are used to supply such liquids to such containers. Pressurized inert gas in gas containers 25 and 28 is used to pressurize the liquids in containers 88 and 83 so as to facilitate the supply of such liquids over lines 41 and 42. With the exception of the two individual electrodes at the outer ends of the battery, which are a hydrogen gas diffusion electrode 81 and an oxygen gas diffusion electrode 82, the remaining electrodes are joined together as pairs of electrodes in compound electrodes, each compound electrode having a hydrogen gas diffusion electrode 81' and an oxygen gas diffusion electrode 82'. The gas carrier liquids are thus supplied over lines 41 and 42, through rising mains 87 and 92 respectively, and into open chambers 43 which are adjacent the coarse pored layers of the hydrogen gas diffusion electrodes and open chambers 44 which are adjacent the coarse pored layers of the oxygen gas diffusion electrodes. It is expedient that the electrodes contain a catalytically inactive coarse pored cover layer as well as a catalytically active working layer and the electrolyte chambers 85, which are positioned between pairs of electrodes of opposite polarity, can also be filled with a porous, electricity non-conducting diaphragm. Instead of the compound electrodes depicted in FIG. 6, electrodes can also be used in which a coarse pored gas conducting layer is located between two working layers. The liquid reactants can be introduced into this coarse pored layer.

The electrical connections for the individual electrodes are not shown in FIG. 6. The individual elements of the battery are connected electrically in series. With the constructive configuration of a fuel cell battery corresponding to that shown in FIG. 6 it is to be noted that parasitic electric currents are to be kept as small as possible. Because of this, connecting lines 41', 41", 42' and 42", which are located between the individual rising mains 87 and 92, should be so constructed that they produce junctures which have a very high ohmic resistance. The resistance is raised even more if the rising mains themselves contain highly ohmic gas bubbles during control oscillations. An electrical cross current is not possible inside of the battery block even though chambers 43 and 44 are filled with liquids at times, since a solution of hydrogen peroxide, which is normally used as the oxygen gas carrier liquid, has a very low electrical conductivity and when the individual elements are connected electrically in series the highest voltage potential difference amounts to 1 volt. The electrode chambers between two of the hydrogen electrodes can also be filled with a 16% by weight solution of sodium borohydride in 6 N aqueous sodium hydroxide without drawbacks during the operation of the battery. Overflow pipes 29 are used to remove excess liquids from chambers 85. The excess liquids are then collected in containers 93 and 94.

The fuel cell elements and batteries of the present invention make possible a flushing or rinsing of the pores of the electrodes in order to prevent concentration polarization in the fresh electrolyte without the need for special additional auxiliary aggregate devices. In this procedure the addition of fresh electrolyte solution occurs through the pores of the electrodes in the electrolyte chambers between the electrodes in proportion to the amount of electric current which is withdrawn from the elements or battery, since the supply of fresh electrolyte solution is linked to the supply of decomposed liquid and the supply of these materials also occurs proportionally to the electrical output withdrawn from the fuel cell element. At the same time, a dilution of the operating liquids, due to the generation of water during the electrochemical reaction, is avoided because of the influx of fresh electrolyte liquid in an amount proportional to the electric current which is generated.

The removal of inert gases from the reaction system is not necessary in the devices of the present invention since one can select liquid coreactants without further ado which do not produce inert gases when they decompose.

With the catalytic decomposition of the liquids, heat is evolved which can be used to maintain the operating temperatures.

With the fuel cell elements of the present invention it is possible to assure, by the use of an excess of the hydrogen yielding liquid based on the potential yield of oxygen, that, after the termination of the operation of the maintenance-free fuel cell elements, the oxygen gas is completely used up and the oxygen electrodes will then assume the hydrogen potential. Under these conditions the oxygen electrodes only exhibit a slight deterioration of the electrodes.

The liquids which can be used for supplying the fuel cell elements with hydrogen or oxygen by the catalytic decomposition of such liquids are subject, in many cases, to spontaneous decomposition. It is not possible then to store these liquids for relatively long periods of time nor to hold fuel cell elements which are filled with these liquids in a stand-by operating condition for relatively long periods of time. In the case, for example, where a 16% by weight solution of sodium borohydride in 6 N aqueous sodium hydroxide is stored at room temperature, the solution has a shelf life of only about two months because of spontaneous decomposition with the attendant evolution of hydrogen.

It is desirable, therefore, to provide storage containers which can be used for supplying fuel cell elements, such as those shown above in FIGS. 1–6, with liquids which contain hydrogen and oxygen yielding materials.

It is also desirable to provide an exchangeable storage container in which such gas yielding liquids can be stored for relatively long periods of time without the occurrence of losses of such liquids, and which containers can be transposed in a short time into a state of operating readiness without the need of expensive and time consuming actuating means, and which containers can be attached to various types of fuel cell elements, such as those shown above in FIGS. 1–6.

A further object of the present invention, therefore, is to provide filling cartridges which are suitable for readily supplying fuel cell elements with liquids which contain hydrogen and oxygen yielding substances after such liquids have been stored for relatively long period of time in such cartridges.

One form of the filling cartridges of the present invention is one which is divided into two separate chambers by a first rupturable membrane. One of such chambers is used to store the gas yielding substance and the second of such chambers is used to store a liquid in which such substance can be dissolved. The orifice of the cartridge which opens into the fuel cell element is sealed during the storage of the cartridge by a second rupturable membrane.

In a particularly advantageous embodiment of such cartridges the cartridge contains a device, known to be used for such purposes, for rupturing the first membrane separating the two chambers. After the rupturing of such membrane the solid or liquid gas yielding substance from one chamber dissolves in the liquid in the second chamber.

Another preferred embodiment of the cartridges of the present invention involves the use of an outer mantle for the cartridge which is at least partially flexible. Thus, by compressing such mantle, the liquid, in which the gas yielding substance has been already dissolved by previously rupturing the first membrane, is pressed into the fuel cell element under pressure, to which element the cartridge is attached One suitable embodiment of such filling cartridges is shown in FIG. 7. This filling cartridge is made of a flexible material, such as polyethylene. In the upper part of the cartridge there is located in first chamber 101 a container 102 which consists of a dividing partition 103, base plate 104 and wall 105. In container 102 there is placed a gas yielding substance such as solid powdery sodium borohydride 106. First rupturable membrane 107 separates chamber 101 from second chamber 108 in which there is placed solvent 109, for example, 6 N aqueous sodium hydroxide, for dissolving the solid borohydride or other gas yielding substance. Rupturable membrane 107 is held by flange 110 of the lower vessel 111 and by flange or collar 112 or hood 113. In order not to place a mechanical strain on rupturable membrane 107, during storage of the filled cartridge, cam bar 114, which rests on Torus 115, is used to support the weight of filled container 102. Under this arrangement chamber 101 is completely encapsulated with the sodium borohydride 106 or other gas yielding substance therein and can be stored indefinitely with solvent 109.

In order to put the cartridge into an operating position one presses the top 116 of the flexible polyethylene hood 113 so hard that container 102 is pushed down by partition 103 and thin membrane 107 ruptures. The cartridge is now shaken for a short time so that the sodium borohydride 106 is completely dissolved in the aqueous sodium hydroxide 109. The attachment of the filling cartridge to the fuel cell element is accomplished by screwing the cartridge by means of threaded head 117 into the attaching receiving head or socket device 118 of the fuel cell element. In the center of the threaded receiving device 118 there is a connecting capillary tube 119. By completely screwing down the cartridge the sharp pointed capillary tube 119 is made to pierce rupturable membrane 120. By compressing the flexible cartridge the solution therein can then be forced under pressure from the cartridge and onto catalyst in the fuel cell element, on which catalyst the liquid decomposes with the formation of hydrogen. Filter 121 serves to filter the liquid passing from the cartridge to the fuel cell element.

It is desirable in many cases to provide the fuel cell element with two connecting heads or sockets, so that, as needed, a second filled cartridge can be screwed or inserted into the first of the two connecting heads to be emptied, when the liquid in one of a previously inserted set of cartridges is almost used up. By using several connecting heads, however, there arises the problem of so fashioning these connecting devices, that the operating gases which are generated in the fuel cell elements are not allowed to escape through these connecting devices into the atmosphere or to seep into the chamber or space above the liquid in a screwed-in cartridge and in this way force too much fluid per unit of time into the fuel cell element because of the thereby resulting increased pressure within the cartridge.

A connecting device which may be used to obviate this problem, and which may be used with the fuel cell elements of FIGS. 1–6 is shown in FIG. 8. As in the case of the cartridge shown in FIG. 7, the cartridge of FIG. 8 is employed by screwing, or otherwise inserting it in a gas and liquid tight manner, into the connecting head of a fuel cell element or into an operating gas generator for a fuel cell element. In the device of FIG. 8, the connecting membrane of the cartridge is pierced by a capillary tube positioned in the receiving head of the fuel cell element or gas generator and by further screwing in of the cartridge a valve is opened through the head of the cartridge, which valve provides free access for the liquid in the cartridge through the capillary to the fuel cell element or gas generator.

The device of FIG. 8 provides a facile way for joining the filling cartridges to the fuel cell elements or gas generators. In the device of FIG. 8, elements 201 to 216 correspond both in function and in construction, to elements 101 to 116, respectively, of FIG. 7. In the upper part of threaded receiving housing 225 a sealing ring 226 is arranged, which seals housing 225 and the smooth surfaced portion of threaded head 217 of the cartridge against each other. Capillary 227 is used to pierce sealing membrane 220 of the cartridge.

Capillary 227 is firmly connected to a movable valve member which consists of a plate 228 and a valve head 229 with an imbedded sealing ring 230, which is pressed against lip 231 of housing 225 with the aid of spring 232, whereby the lower orifice of capillary 227, which is in the direction of the fuel cell element, is formed by cross borings 228a in the valve body, and the valve is sealed, in the standby position, by sealing ring 230 against the liquid chamber of the fuel cell element or of the gas generator 235.

The connection of the filling cartridge to the fuel cell element or gas generator is accomplished by screwing threaded head 217 of the cartridge into threaded housing 225 of the connecting device which is firmly attached to the fuel cell element or gas generator 235. In this way the threadless shaft portion of connecting head 217 is made to project into housing 225 of the connecting device. Housing 225 is sealed against connecting head 217 by means of sealing ring 230. Then filling cartridge is screwed into housing 225 by means of threaded head 217. In this way membrane 220 is pierced by pointed capillary 227. By further screwing in the cartridge, the cartridge is made to press threaded head 217 onto plate 228 whereby spring 232 is compressed and sealing ring 230 is lifted off lip 231. If one now compresses flexiible container 211 then the dissolved sodium borohydride flows through capillary 227 and the borings in membrane 220 into chamber 233, in order to then enter fuel cell supply line 234 which conducts the liquid directly to the catalytically active layer of the hydrogen electrode, whereby the generation of hydrogen gas is conducted as noted above with reference to FIGS. 1–6. If a second connecting device is provided, the fluid delivery line of which is also connected to line 234, then it is thus provided that during the operation of the fuel cell element an additional filling cartridge can be attached to the fuel cell element or an empty cartridge can be replaced by a full one. If, for example, the contents of a filling cartridge are almost consumed by active operation of the fuel cell element, then one prepares additional borohydride solution with the aid of a second filling cartridge and connects it to the second connecting device. When this new cartridge is firmly screwed in then the empty cartridge can be screwed off.
forced against lip 231 due to expanding spring 232. In Valve 228/229 closes automatically. Sealing ring 230 is forced against lip 231 due to expanding spring 232. In this way the first empty connecting device is ready for the reception of another filling cartridge.

The flexible materials used for the construction of the filling cartridges should be materials which are inert to the reactants stored therein.

We claim:
1. A means to control the flow of liquid gas-carrier to a fuel cell battery of the type comprising at least one fuel cell element using an aqueous electrolyte for continuous operation of the battery said electrolyte being contained between electrodes at least one of which is a gas diffusion electrode having a catalytically active layer on its surface remote from said electrolyte, and having a chamber enclosing the side of said electrode incorporating said catalytically active layer, liquid gas-carrier storage means for providing liquid gas-carrier at a liquid head to normally flood said chamber, and liquid gas-carrier supply-line means connecting said storage means to said chamber, the control means comprising a portion of said liquid gas-carrier supply-line means leading to said chamber, said portion including a gas receiver connected at its lowest point to the bottom of said liquid gas-carrier storage means, and at its highest point to said chamber, said connection to said chamber being at a low point of said chamber such that an increase of gas pressure in said chamber will force said gas-carrier liquid into said gas receiver against the fluid head at the bottom of said chamber, said gas receiver having a volume to receive all of the gas evolved by contact of said gas-carrier with said catalytically active layer but not consumed by said battery, whereby the amount of gas-carrier liquid fed to said chamber is adjusted to the amount required by the battery.

2. A fuel cell battery as in claim 1 in which the fuel gas diffusion electrodes are hydrogen gas diffusion electrodes.

3. A fuel cell battery as in claim 1 in which a liquid gas carrier supply line means gas is provided to supply liquid gas carrier to the catalytically active layers of the electrodes of both polarities.

4. A fuel cell battery as in claim 1 in which said electrodes are in a vertical operating position and said liquid gas carrier supply line means is adapted to supply said liquid gas carrier at the bottom of said vertically positioned electrodes.

5. A fuel cell battery as in claim 1 in which said liquid gas carrier storage means are provided with inert gas pressurizing means adapted to pressurize said storage means with inert gas for the purpose of providing a pressurized flow of liquid gas carrier from said storage means to said catalytically active layers.

6. A fuel cell battery as in claim 5 in which the liquid gas carrier storage means for both the oxygen gas carrier and the fuel gas carrier have common inert gas pressurizing means.

7. A fuel cell battery as in claim 1 in which the liquid gas carrier supply line means further comprises filter means adapted to filter out catalyst particles and prevent said particles from passing into said liquid gas carrier storage means.

8. A fuel cell battery as in claim 1 in which said liquid gas carrier supply line means are adapted to supply liquid gas carrier to said electrodes so that almost the entire surface of the catalytically active layers of such electrodes may be covered with said liquid gas carrier.

9. A fuel cell battery as in claim 8 in which said electrodes are in a horizontal operating position and said liquid gas carrier supply line means is adapted to supply liquid gas carrier to the catalytically active layers of said horizontally positioned electrodes.

10. A fuel cell battery as in claim 1 which comprises a plurality of said fuel cell elements.

11. A fuel cell battery as in claim 10 in which all the electrodes of one polarity have common liquid gas carrier supply line means.

12. A fuel cell battery as in claim 1 in which each fuel cell element further comprises an electrolyte chamber between each pair of electrodes and each electrolyte chamber has at least one outlet adapted to discharge excess electrolyte from said electrolyte chamber.

13. A fuel cell battery as in claim 12 in which said electrolyte chamber comprises a porous diaphragm adapted to contain electrolyte.

14. A fuel cell battery as in claim 13 in which said porous diaphragm is more fine pored than said catalytically active layers.

15. A fuel cell battery as in claim 12 in which the electrolyte discharge oulet of at least one fuel cell element is in electrolyte supply communication with the electrolyte chamber of a second fuel cell element.

16. A fuel cell battery as in claim 1 in which the operating gas generating chamber of at least one electrode is in gas supply communication with the operating gas chamber of at least one other electrode of the same polarity.

17. A fuel cell battery as in claim 1 in which said liquid gas carrier storage means comprises a liquid gas carrier filling cartridge adapted to store said liquid gas carrier for relatively long periods of time and to deliver said liquid gas carrier to said element as needed.

18. A fuel cell battery as in claim 17 in which
said fuel cell element further comprises an internally threaded socket affixed to the outside wall of said element and having capillary tube means which project into said socket and are adapted to provide liquid supply communication with the catalytically active layer of said electrodes, and
said filling cartridge comprises a flexible housing having an externally threaded head sealed by a first rupturable membrane, said head being adapted to being screwed into said socket and said first membrane being adapted to being pierced by said capillary tube means when said head is screwed into said socket, a plurality of chambers within said housing separated by a second rupturable membrane, which second rupturable membrane is adapted to being ruptured by a flexing of said housing and which chambers are adapted to separately store operating gas supplying substance and solvent for such substance for relatively long periods of time and to allow for the admixture and eventual dissolution of said substance in said solvent upon the rupture of said second rupturable membrane, and
said housing is adaptable to being compressed after the formation of said solution and thereby force said solution from said housing, through said capillary tube means and into said fuel cell element.

19. A fuel cell battery as in claim 18 in which said filling cartridge further comprises internal filter means adapted to filter out solid particles of said substance and thereby prevent such particles from passing from said cartridge into said fuel cell element.

20. A fuel cell battery as in claim 18 in which said socket further comprises a pair of internally projecting lips, and said capillary tube means is housed in a movable valve adapted to being seated and sealed against said lips so as to seal said capillary tube means from said fuel cell element, and spring means adapted to so seat and seal said valve against said lips when said filling cartridge is not screwed in said socket and which spring means is adapted to being compressed by the head of said filling cartridge when said filling cartridge is screwed in so as to thereby unseat said valve, allow said capillary tube means to pierce said second rupturable membrane and provide liquid supply communication between said filling cartridge and said fuel cell element.

References Cited

UNITED STATES PATENTS

| | | | |
|---|---|---|---|
| 2,070,612 | 2/1937 | Niederreither | 136—86 |
| 3,143,440 | 8/1964 | Hunger et al. | 136—86 |
| 3,180,763 | 4/1965 | Miller et al. | 136—86 |
| 3,201,282 | 8/1965 | Justi et al. | 136—86 |
| 3,275,475 | 9/1966 | Cohn et al. | 136—86 |
| 3,342,641 | 9/1967 | Burhorn et al. | 136—86 |
| 3,364,070 | 1/1968 | Alexander | 136—86 |
| 3,411,951 | 11/1968 | Gelting | 136—86 |
| 3,432,355 | 3/1969 | Niedrach et al. | 136—86 |
| 3,453,147 | 7/1969 | Griffin | 136—86 |
| 3,457,114 | 7/1969 | Wedin | 136—86 |
| 2,658,819 | 11/1953 | Formwalt | 23—282 X |
| 3,464,862 | 9/1969 | Perry | 136—86 |

FOREIGN PATENTS

| | | |
|---|---|---|
| 1,476,498 | 2/1967 | France. |
| 1,486,405 | 5/1967 | France. |
| 951,161 | 3/1964 | Great Britain. |
| 1,011,076 | 11/1965 | Great Britain. |
| 10,228 | 1911 | Great Britain. |

ALLEN B. CURTIS, Primary Examiner

U.S. Cl. X.R.

136—160